US006621446B1

(12) United States Patent
Chaillie

(10) Patent No.: US 6,621,446 B1
(45) Date of Patent: Sep. 16, 2003

(54) REMOTE CONTROL UNIT

(75) Inventor: Frederic Chaillie, Bloomfield Hills, MI (US)

(73) Assignee: Siemens VDO Automotive S.A.S., Toulouse (FR)

( * ) Notice: Subject to any disclaimer, the term of this patent is extended or adjusted under 35 U.S.C. 154(b) by 0 days.

(21) Appl. No.: 09/674,117

(22) PCT Filed: Apr. 20, 1999

(86) PCT No.: PCT/EP99/02669

§ 371 (c)(1), (2), (4) Date: Jan. 2, 2001

(87) PCT Pub. No.: WO99/55992

PCT Pub. Date: Nov. 4, 1999

(30) Foreign Application Priority Data

Apr. 24, 1998 (FR) ........................................ 98 05176

(51) Int. Cl.[7] ........................ H04L 17/02; G08C 19/12

(52) U.S. Cl. ...................... 341/176; 341/22; 200/302.1

(58) Field of Search ............... 341/22, 176; 200/302.1, 200/302.2, 303

(56) References Cited

U.S. PATENT DOCUMENTS

| | | | | | |
|---|---|---|---|---|---|
| 4,520,247 | A | * | 5/1985 | Pancook et al. | 200/298 |
| 5,260,532 | A | * | 11/1993 | Tinder et al. | 200/302.1 |
| 6,462,291 | B1 | * | 10/2002 | Sachs | 200/302.2 |

* cited by examiner

*Primary Examiner*—Timothy Edwards
(74) *Attorney, Agent, or Firm*—Laurence A. Greenberg; Werner H. Stemer; Gregory L. Mayback

(57) ABSTRACT

The unit (1) comprises two half-shells (11, 12) and a membrane (2) acting as a seal. The membrane comprises various zones of shapes and of properties suitable for providing additional functions such as a lightguide (21), a contact lug (23) and battery retainer lug (4), or else an escape path for static electricity discharges (25).

3 Claims, 1 Drawing Sheet

REMOTE CONTROL UNIT

BACKGROUND OF THE INVENTION

Field of the Invention

The present invention relates to a remote control unit, for example of the type used together with a motor vehicle key to remotely control the opening or the closing of the vehicle doors.

At present, it is common practice for motor vehicle keys to be combined with remote control devices, housed in the bow end of the key or in an associated key holder. These devices are subject to environmental attacks, such as, for example, falling into a pool of water, and must therefore be especially protected, both for watertightness and for impact resistance. Such a key is known from the prior art, for example, from document EP-A-0 690 189, the bow end of which key forms a unit in two parts, one of these parts comprising a deformable member acting as a control button for the remote control, this member being secured by a seal providing the peripheral watertightness of the unit. However, the remote control device comprises components such as light-emitting diodes or indicator lights which the seal of the prior art is limited to surrounding, thus achieving only purely relative watertightness. Such a unit is further known from document DE 94 00 748, in which the seal is produced in the form of a flexible membrane covering the internal wall of a half-unit and having a window transparent to emitted waves, while maintaining watertightness. Nevertheless, in the case of shock, the components of the device are likely to shift, thus compromising not only the watertightness, but also the proper operation of the device. In addition, this type of unit, combined with a key, is by nature often handled and subject to static electricity discharges likely to damage the enclosed electronic components.

SUMMARY OF THE INVENTION

The objective of the present invention is therefore to propose a remote control unit which takes into account the various types of environmental attack and allows the remote-control electronic device that it contains to be effectively and economically protected.

This objective of the invention together with others which will appear in the rest of the present description are achieved by means of the remote control unit, of the type formed by two half-shells enclosing a printed circuit and a seal designed to isolate said circuit from the external surroundings.

According to the invention, the seal is formed by a flexible membrane separating the unit into two chambers and comprising, at least locally, an electrically conducting zone.

According to an advantageous characteristic of the invention, one of the half-shells of the unit is designed to house a power-supply battery for the electronic circuit and the flexible membrane comprises at least one conducting zone, forming a protuberance connecting the electronic circuit to at least one of the battery terminals and simultaneously forming a retaining spring for the power-supply conductor and battery.

According to another characteristic of the invention, the unit is designed to engage with a metal key bit in order to form a key for a motor vehicle and has a hole through which a keyring passes and the flexible membrane comprises at least one conducting zone forming, on the one hand, a protuberance bearing against part of the key bit and extending, on the other hand, around the hole in the form of a flange projecting into the hole, constituting an escape path for static electricity discharges from the ring to the key bit.

Other characteristics and advantages of the unit according to the unit will appear on reading the description which will follow and on examination of the appended drawings in which:

DESCRIPTION OF THE PREFERRED EMBODIMENT

Figure 1:
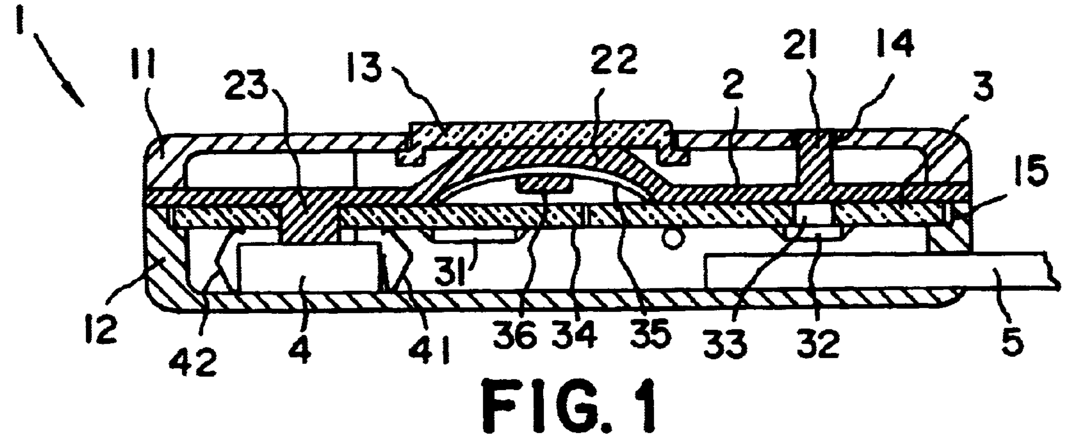
FIG. 1 shows a sectional view of the unit according to the invention.

FIG. 1 shows a section through a unit 1 formed by two half-shells 11 and 12. The inside of the unit is divided into two chambers by an elastomer membrane 2, the periphery of which is pinched between the two half-shells. The two half-shells are fixed to each other by fixing means such as clips (not shown). The lower chamber, defined by the member 2 and the half-shell 12, contains a printed circuit 3 equipped with electronic components 31, 32, at least one of which is a light-emitting component such as a light-emitting diode 32. These components (of the surface mounting type) are attached to the printed circuit 3 by soldering or adhesive bonding. The printed circuit 3 bears against a projection 15 made in the half-shell 12 over at least part of its periphery. The height of this projection is chosen to be slightly less than the thickness of the printed circuit 3. Thus, when the two half-shells 11 and 12 are closed again, the printed circuit 3 is held firmly by the elasticity of the membrane 2. The lower chamber also contains a battery 4, the terminals of which are connected to the printed circuit 3 via contacts 41 and 42, which are in the form of flexible metal strips bearing on one side against the battery and on the other side against a conducting pad of the printed circuit. When the unit 1 is designed to form the bow end of a key, a key bit 5 is combined with one of the half-shells, here for example to the lower half-shell 12.

Some characteristics of the membrane 2, which enable it to fulfil other advantageous functions in addition to its basic function of sealing the lower chamber, will now be detailed.

Figure 2:
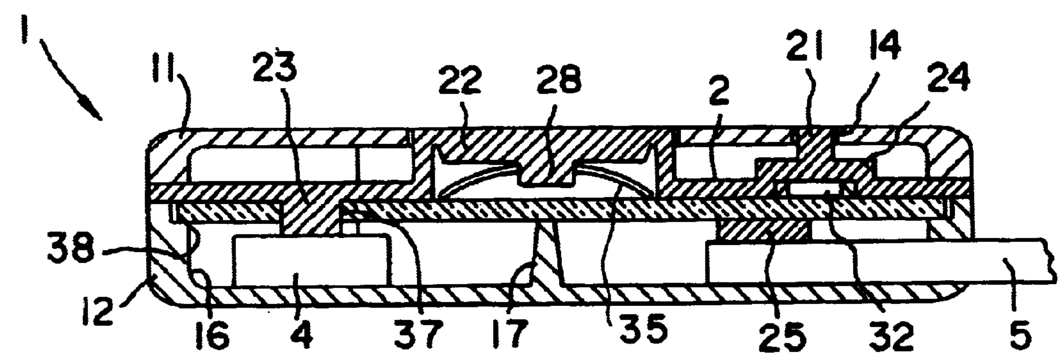
FIG. 2 shows another view along the same section, showing other characteristics of the invention.

The membrane 2 comprises, at right angles to the light-emitting diode 32, a zone Z1 (FIG. 3) in which the material used is transparent of translucent. The diode 32 is attached to the printed circuit 3, for example on the side opposite to that of the membrane. An aperture 33 in the printed circuit allows light emitted by the diode to pass through. At this point, the membrane comprises a tubular protuberance 21 which engages with an orifice 14 made in the upper half-shell 11. A light-guide is thus obtained, which allows the light information to be transmitted from the diode 32 to the outside of the unit, without sacrificing the seal of the lower chamber, and to do so in a simple manner independent of the height of the half-shell 11. Of course, if it is imposed by manufacturing restrictions, the diode 32 may be placed on the upper face of the printed circuit 3, by making a housing 24 to accommodate the diode, as shown in FIG. 2.

The membrane 2 further comprises a deformable part 22 which engages with a movable member 13 passing through the upper half-shell 11 to produce a control button. This deformable part 22 is formed, on its face facing the printed circuit 3, in such a way as to maintain and center a dome 35 made of flexible material, capable of giving a tactile clicking sensation when, by pressing on the movable member 13, a contact 36 made of conducting material, borne by the dome, is pressed against the printed circuit 3. In this respect, it may be noted that the membrane 2 is pressed onto the printed circuit 3 at least on the periphery of the dome. To prevent it coming unstuck from the printed circuit under the effect of the pressure developed under the dome, at least one via 34 or plated-through connection hole has been advantageously placed between the two faces of the printed circuit in this zone.

In order to precisely place the membrane 2 with respect to the printed circuit 3, use can be made of centering lugs obtained during the molding of the membrane and engaging with holes in the printed circuit. The number 23 indicates one of these lugs, which is advantageously placed at right angles to the battery 4. The lug 23 is long enough to pass through the printed circuit 3 and to bear against the battery 4, with enough pressure to firmly hold the battery in a housing (not shown) made in the half-shell 12. Thus, when the unit is closed, the battery is held in place and it does not suffer from intermittent contact with the contacts 41, 42 during shocks or vibrations. In addition, the lug 23 enables the printed circuit 3 to be supported when the movable member 13 is pressed, thus limiting the relative movement of the contacts 41, 42 over their conducting pads so as to further improve the reliability of the contact. For this same purpose, the half-shell 12 may comprise, as shown in FIG. 2, one or more support lugs 17, placed at right angles to the deformable zone 22, in order to limit the flexing of the printed circuit Reference will now be made to FIG. 2 so as to shed light on certain advantageous characteristics which may be obtained by the fact that it is possible, according to a known technique for producing such membranes, to locally combine materials having different physical characteristics. This is because these membranes are obtained by depositing elastomer blanks into a mold, which blanks will be shaped on closing the mold under predetermined temperature and pressure conditions. By using blanks of predetermined color, transparency and electrical conductivity, a multifunction membrane can thus be obtained economically.

Figure 3:
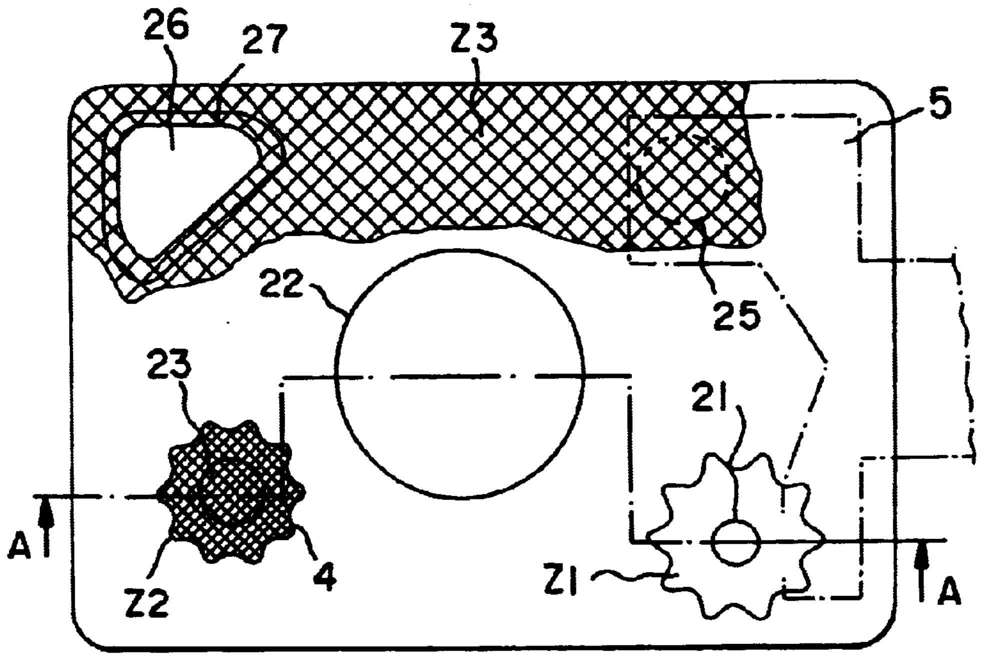
FIG. 3 shows a plan view of the membrane locating zones with particular characteristics.

For example, the reduced current consumption of the electronic device borne by the printed circuit 3 is put to good use in order to make the lug 23 from a material having a high conductivity (for example an elastomer highly filled with carbon particles), defined locally by the zone Z2 in FIG. 3, which enables an electrical connection to be made between one terminal of this battery and the printed circuit 3 while still mechanically holding the battery 4 in place, as seen previously. In this case, the lug 23 passes through the printed circuit 3 via a plated-through hole 37 in order to connect the first terminal of the battery 4, and a metal track 16 on the half-shell 12 connects the second terminal to a supply track 38 on the printed circuit 3. The contacts 41 and 42 in FIG. 1 can thus be omitted.

The movable member 13 of FIG. 1 can also be dispensed with by adapting the shape of the deformable part 22 so that it engages with the aperture of the half-shell 11 in order for the control button of the device to be formed directly. Advantageously, this deformable part 22 comprises in its center a protuberance 28 made of conducting material, engaging with a hole in the dome 35 in order to center it under the control button, and with tracks of the printed circuit 3 in order to operate the control contact of the device.

Reference will now be made to FIG. 3 in order to detail an additional characteristic of the membrane 2, which makes it possible to improve the resistance to electrical discharges of the electronic device contained in the unit. As has been seen previously, the unit 1 may be designed to form the bow end of a key intended to open the doors of a vehicle. It has been noted in this use that static electricity discharges could damage the electronic components carried by the printed circuit 3. The most frequent path for these discharges connects a keyring (not shown), passing through a passage 26 made in the unit, to the key bit 5, via paths of least resistance, such as the tracks of the printed circuit 3 and the components 31 which are attached thereto. In order to solve this problem, the membrane 2 comprises a conducting zone Z3, which connects the ring passage 26 to the key bit 5. A flange 27, formed in the membrane, protrudes into the passage 26 in order to make contact with the ring. A contact lug 25 bears against a part of the key bit 5 inserted into the unit, passing, where appropriate, through the printed circuit 3. The zone Z3 therefore provides a path of least resistance suitable for diverting electrostatic discharges directly toward the key bit 5, thus sparing the components.

I claim:

1. In a remote control unit of the type formed by two half-shells enclosing a printed circuit and a seal insulating said circuit from external surroundings, said seal comprising a flexible membrane separating the unit into two chambers, the improvement which comprises: said membrane forming, at least locally, an electrically conducting zone.

2. The unit according to claim 1, wherein one of said half-shells is configured to house a power-supply battery for the electronic circuit and said conducting zone of said flexible membrane forms a support lug connecting said electronic circuit to at least one battery terminal of said battery and simultaneously forms a power supply conductor and a retaining spring for said battery.

3. The unit according to claim 1 and configured to engage with a metal key bit to form a key for a motor vehicle and having an opening formed therein for a key-ring, wherein said conducting zone of said flexible membrane forms a contact lug bearing against a part of the key bit and extends around said opening as a flange projecting into said opening, constituting an escape path for static electricity discharges from the ring to the key bit.

* * * * *